H. SPLITDORF.
Telegraph-Sounders.

No. 149,539. Patented April 7, 1874.

Witnesses:
Ernst Bilfuder
Henry Gentner

Inventor:
Henry Splitdorf
Van Santvoord & Hauff
Attys

UNITED STATES PATENT OFFICE.

HENRY SPLITDORF, OF NEW YORK, N. Y.

IMPROVEMENT IN TELEGRAPH-SOUNDERS.

Specification forming part of Letters Patent No. 149,539, dated April 7, 1874; application filed February 26, 1874.

*To all whom it may concern:*

Be it known that I, HENRY SPLITDORF, of the city, county, and State of New York, have invented a new and useful Improvement in Sounders for Telegraphic and other Purposes; and I do hereby declare the following to be a full, clear, and exact description thereof, which will enable those skilled in the art to make and use the same, reference being had to the accompanying drawing forming part of this specification, in which drawing—

Figure 1:
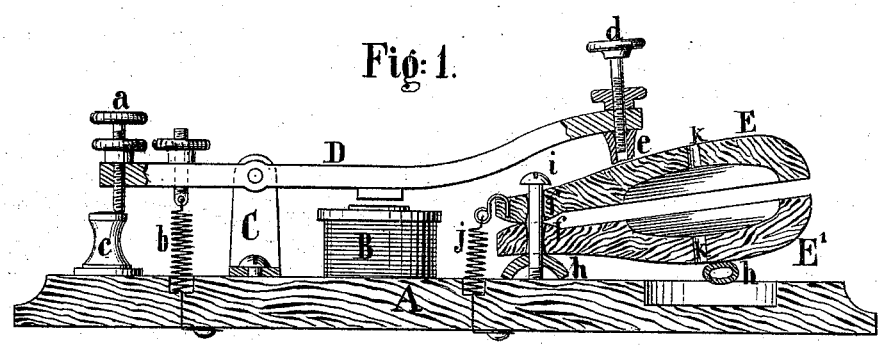
Figure 2:
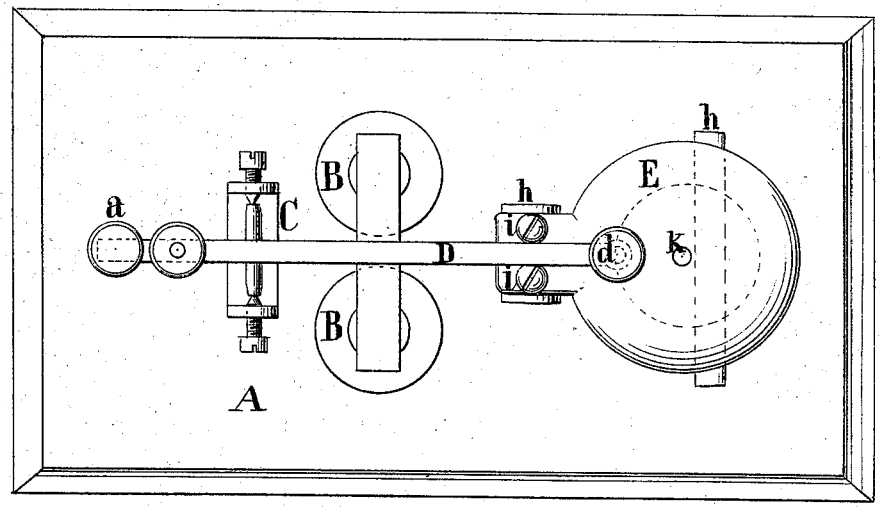

Figure 1 represents a longitudinal vertical section of this invention. Fig. 2 is a plan or top view of the same.

Similar letters indicate corresponding parts.

This invention consists in combining with the armature-lever of an electro-magnet two sounding-cups, which are connected and supported in such a manner that, whenever the armature of the electro-magnet is attracted, the two sounding-cups are clapped together, and thereby a clear and distinct rap is produced.

In the drawing, the letter A designates the bed-plate, which supports the electro-magnets B, and from which rises a standard, C, that forms the bearings for the fulcrum of the armature-lever D. The position of this lever in relation to the electro-magnets is regulated by a set-screw, $a$, and a spring, $b$, in the usual manner, and, if said lever is allowed to follow the action of its spring, the set-screw bears upon the surface of a post, $c$, that rises from the bed-plate A. In the end of the armature-lever D opposite to that which contains the set-screw $a$ is secured a screw, $d$, with an elastic tip, $e$, which bears upon the upper sounding-cup E. This cup E acts, in conjunction with the lower sounding-cup E', to produce a short distinct rap whenever the armature of the electro-magnet is attracted. Said cups are, by preference, made of wood; and they are provided near their inner ends with rounded protuberances $f$, which form the bearing-point between the two cups. The lower cup E' rests with its convex side upon elastic cushions $h$, and one or more screws, $i$, secure the two cups together. These screws are tapped into the bed-plate A, and the holes in the shanks of the cups, which receive said screws, are so formed that the cups can oscillate toward and from each other without obstruction. A spring, $j$, serves to hold the edges of the two cups apart, as shown in Fig. 1, said spring being either applied to the rear end of the upper cup, or, if desired, it may be placed between the two cups.

The volume of the sound produced by my cups may be increased by boring holes $k$ through their bodies.

By combining these sounding-cups with the armature-lever of an electro-magnet, I obtain a sounder which produces clear and distinct raps whenever the armature is attracted, said raps being of such volume that the sound produced by the back stroke of the armature-lever, or by the contact of the screw $a$ with the post $c$, is completely drowned, and the operator is enabled to follow the motions of the armature-lever with the greatest ease. My sounder can also be used in place of an alarm, the noise produced by the cups E E' being audible at a considerable distance.

The sounding-cups may be placed in a horizontal or in a vertical position; and, if they are placed in a vertical position, no spring is required to keep them apart, since in that case the outer or loose cup will fall away from the inner or fixed cup by its own gravity.

What I claim as new, and desire to secure by Letters Patent, is—

The combination of sounding-cups E E' with the armature-lever of an electro-magnet, substantially in the manner and for the purpose herein shown and described.

HENRY SPLITDORF.

Witnesses:
 W. HAUFF,
 E. F. KASTENHUBER.